F. ECAUBERT.
MIXING AND SEPARATING MACHINE.
APPLICATION FILED DEC. 12, 1908.

1,011,929.

Patented Dec. 19, 1911.

2 SHEETS—SHEET 1.

WITNESSES

INVENTOR
FREDERIC ECAUBERT
BY
ATTORNEYS

F. ECAUBERT.
MIXING AND SEPARATING MACHINE.
APPLICATION FILED DEC. 12, 1908.
1,011,929.
Patented Dec. 19, 1911.
2 SHEETS—SHEET 2.
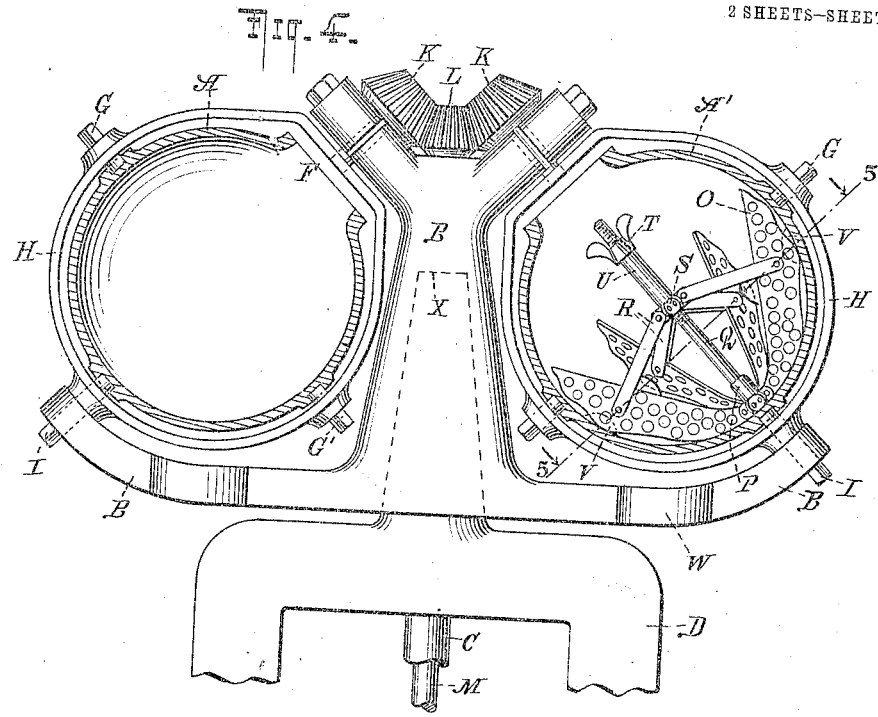
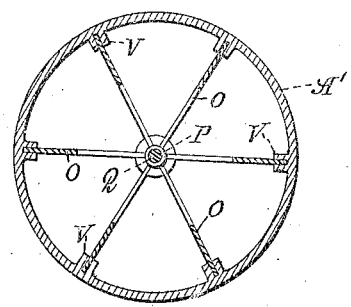
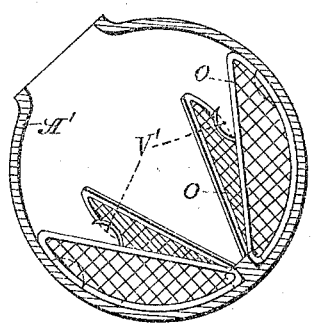
WITNESSES
INVENTOR
FREDERIC ECAUBERT
BY
ATTORNEYS

UNITED STATES PATENT OFFICE.

FREDERIC ECAUBERT, OF NEW YORK, N. Y.

MIXING AND SEPARATING MACHINE.

1,011,929.  Specification of Letters Patent. Patented Dec. 19, 1911.

Application filed December 12, 1908. Serial No. 467,245.

*To all whom it may concern:*

Be it known that I, FREDERIC ECAUBERT, a citizen of the United States, and a resident of the borough of Brooklyn, city of New York, county of Kings, and State of New York, have invented certain new and useful Improvements in Mixing and Separating Machines, of which the following is a specification.

My invention relates to that class of mixing and separating machines in which the materials to be operated upon are placed in a vessel and adapted to have a combined planetary and axially rotative motion, and is adapted to be useful especially in connection with the mechanism of the mixing and separating machine disclosed and claimed by me in Letters Patent 895,173, issued August 4, 1908.

More particularly my invention comprises a special arrangement of the receptacle, by which it may be easily and quickly filled with the materials to be operated upon before, and similarly emptied after, operation without the necessity of using any form of cover or other closure.

Figure 1:
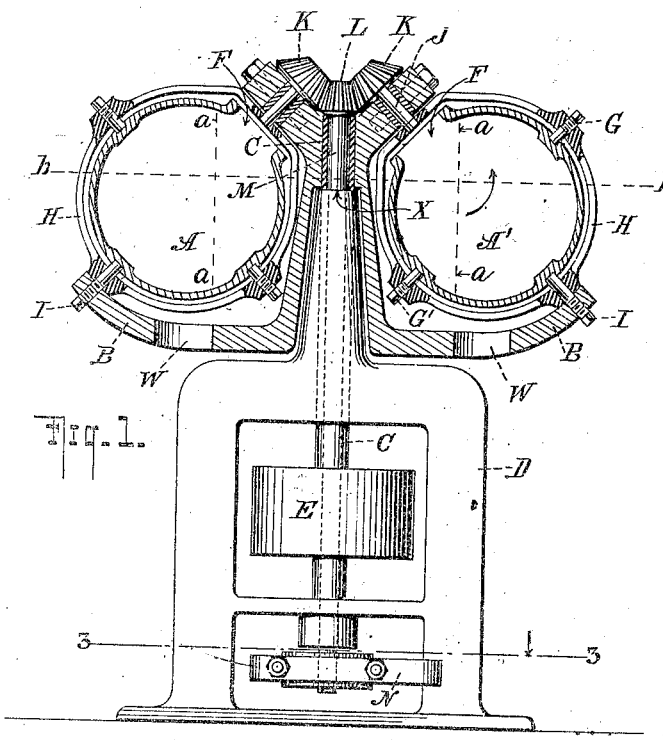
Figure 2:
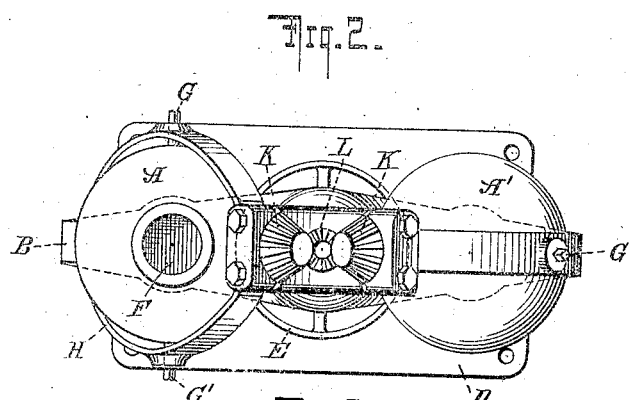
Figure 3:
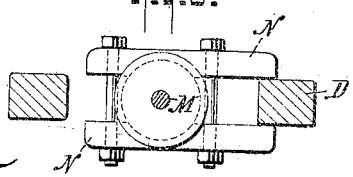

Referring to the drawings, Figure 1 is an elevation, part section, of a preferred form of my invention; Fig. 2 a plan view of Fig. 1 showing the left container in the open position; Fig. 3 is a detail sectional view of the brake mechanism on the line 3—3 of Fig. 1; Fig. 4 is an elevation, part section, on an enlarged scale of the upper portion of Fig. 1, the lower structure being broken away and one of the receptacles being shown with internal mixing segments; Fig. 5 is a section along the line 5—5 of Fig. 4; and Fig. 6 an elevation, part section, of one of the receptacles with a modified form of mixing segment.

A—A' are spherical containers, carried opposite one another by the bracket B, which bracket is keyed or otherwise securely fastened to a revolving sleeve C, the bracket and sleeve being supported by a main frame D. A pulley E enables the sleeve to be revolved, thus rotating the two containers A and A' with their bracket or carrier B. Each of these receptacles A, A' has an opening F and is held by diametal journals G, G' in the support H. A pin I, threaded into the carrier B, projects into a recess in the container, locking it in position, and serving as a lower bearing for the support H.

Each of the supports H is provided above with a shaft J and bevel gear K. A third gear L engages with the two gears K and is driven by a shaft M inclosed within the sleeve C.

A brake device N, composed of two parallel strips and capable of being released or tightened by bolts, is placed in the bottom of the frame D and incloses the lower end of the small shaft M.

In operation, each receptacle A, A' is turned on the bearings I and J until the journals G and G' are horizontal, (see Fig 2). By then unscrewing the stop bearing I, the neck of the receptacle may be swung outward until the face of the opening is substantially horizontal and the materials which are to be mixed placed therein. The receptacle is then thrown back and the pin I locked into place. If, now, the sleeve C be rotated at suitable speed by applying belt to the pulley E, the brake N being first tightened upon the shaft M, the containers will be subjected to a planetary motion at the end of their supporting fixture and also to a rotary motion about their own axis. The centrifugal force derived from this planetary motion acts upon every portion of the contained material to carry it against the outer wall of the containers, from which position the material is constantly and continuously moved by reason of the axial motion which each container individually has. This will result in a very complete mixing of the contained ingredients. It will be noted that on account of the inclined axis of the containers, the two forces which are simultaneously acting upon each part of the material are thus acting in different directions thus assuring a very thorough mixture.

I may increase the rotative pull of each container upon the ingredients held by it by means of suitably positioned radial vanes. These vanes may be permanently placed, or preferably may be removable, in such case being held by slotted bosses V', Fig. 6, made an integral part of the inner wall of the container. In Fig. 4 I have shown an improved vane structure which is very quickly and easily removed for cleaning and which possesses a number of advantages. This structure is composed of a number of flat sheets O suitably pierced with holes and pivoted at a point P to a vertical standard Q. Above, each vane is joined by an arm R to a central sliding sleeve S, a nut T having a prolongation U and threaded to Q bearing upon S to expand the vanes. The vanes, therefore, open and close like the ribs of an umbrella and by unscrewing T may be readily withdrawn from the container. When placed within the container and T screwed up, the segments are clamped securely to the interior of the container, slotted bosses V being provided to receive the vanes and prevent any peripheral shifting. When the mixing operation is complete the machine is stopped and each container is again rotated on the bearings I and J until G and G' are horizontal. Bearing I is again unlocked and the container rotated upon the axis G, G' until the mouth F is at the bottom, when the contents or charge of the container may be emptied through the hole W. The container mouth is again thrown upward when a fresh charge may be inserted. In charging, the container may be filled up to a level $b$, $b$, or practically until the lower edge of the inclined mouth F is reached. In operation this level tends to tilt in the direction of the arrow Fig. 1 into a limit position $a$, $a$, in which position or approaching thereto, the mixing action takes place. It will be noted that in no position between these two limits is there any possibility of escape of contents so that my invention may be used without any cover or with a loose fitting cover for the container thus greatly facilitating the charge and discharge of contents. It will be noted also that the interior of my container is practically free and smooth and is therefore very easy to clean. By suspending the containers in the fixture H, and out of contact with their surface I also avoid friction on the outside wall of the container and prevent leakage.

I may obviously substitute equivalent mechanism for the brake N acting upon the inner shaft M.

I have described my machine as used in mixing processes. I may, however, use it equally as well for separating process such as the separation of butter fat as in ordinary churning, or as described in my previously referred to Patent No. 895,173, August 4, 1908, I may introduce a fat holding odors into the vessel together with alcohol giving the container a combined planetary and axially rotated motion, thus producing a thorough mixing. By then employing the circular motion only the fat particles will be thrown out beyond the alcohol and will tend to coagulate releasing the alcohol which has absorbed the odors so that it may then be drawn off by a siphon or in any other convenient way.

It will be observed that the bracket or carrier B is supported at point X upon the frame D; the location of this point X so high up in the machine, enables me not only to make a compact mechanism but to lower the containers so as to make the openings F readily accessible without requiring the person filling the containers to mount upon a platform or a ladder. The proper location of the point X is as high as possible in the entire device.

I claim:

1. The combination of a rotatable carrier and a container mounted to turn on said carrier about an axis arranged obliquely with reference to that of the carrier in a manner to prevent the contents of the container from being expelled by centrifugal force and to revolve about the axis of the carrier.

2. The combination of a carrier mounted to rotate about an upright axis and a container mounted to turn on said carrier about an axis inclined upwardly toward the carrier's axis and to revolve about the axis of said carrier, said container having an opening at the axial region of its upper portion so located as to prevent the contents of the container from being expelled by centrifugal force.

3. The combination of a carrier and a container mounted to turn thereon about an inclined axis and to revolve about the axis of the container, said container having an opening at the axial region of its upper portion so located as to prevent the contents of the container from being expelled by centrifugal force.

4. The combination of a vertical driving shaft, a container means connected with the shaft for imparting orbital motion to the container, means for rotating the container about its axis, said container having an opening at its upper end of the container's axis forming an acute angle with the shaft, and so located as to prevent the contents of the container from being expelled by centrifugal force.

5. The combination of the rotatable carrier, the support mounted to turn on said carrier about an axis arranged obliquely with reference to that of the carrier, and mounted to swing on said support about an axis transverse to its axis of rotation, and movable means for normally locking the container to its support.

6. The combination of the rotatable carrier, alining pivots mounted on said carrier and disposed obliquely to that of the carrier, one of said pivots being movable lengthwise, a support mounted to rotate about said oblique axis, and a container mounted to swing on said support about an axis transverse to its axis of rotation, yet adapted to be locked to the support by the longitudinal movement of said pivot.

7. The combination of the carrier and the container mounted to turn thereon about an inclined axis, said container having an opening at the axial region of its upper portion and a stirrer projecting into the container axially and arranged substantially stationary relatively to said container.

8. The combination of the rotatable carrier, the container mounted to turn on said carrier about an axis arranged obliquely with reference to that of the carrier and to revolve about the axis of said carrier, and a support engaging the carrier at about the level of the center of gravity of the entire revolving structure.

9. The combination of the carrier and the container mounted to turn about a radially inclined axis, said container having an opening lying wholly within the region of minimum centrifugal force within said container.

10. The combination of the carrier and the container mounted to turn about a radially inclined axis said container having an opening lying wholly within the region of minimum centrifugal force within the container, and above the line of maximum contents of said container when the carrier and container are at rest.

11. The combination of the carrier and the container mounted to turn about a radially inclined axis, said container having an opening wholly intermediate the gravital and centrifugal surface planes of the contents of said container.

12. The combination of the rotatable carrier, the annular support mounted to turn on said carrier about a radially inclined axis, the container mounted to swing on said support about an axis transverse to its axis of rotation, means for locking the container against said transverse rotation and means for releasing said locking means.

13. The combination of the carrier, means for supporting a revoluble container on said carrier on a radially inclined axis, means for supporting said container to revolve on an axis transverse thereto and means for rendering the last recited means inoperative.

14. The combination of the rotatable carrier, a gimbal ring mounted to turn on said carrier about an axis arranged obliquely with reference to that of the carrier, and a container carried by said gimbal ring.

15. The combination of the carrier mounted to turn about a vertical axis, a gimbal ring mounted thereon to turn about an axis inclined upwardly toward the carrier's axis, and a container carried by said gimbal ring, said container having a restricted opening at the axial region of its upper portion.

16. The combination of the carrier, a gimbal ring rotatable thereon about an inclined axis, and a container carried by said gimbal ring, said container having an opening at the axial region of its upper portion.

17. The combination of a vertical driving shaft, a rotatable gimbal ring, a container carried by said gimbal ring, means connected with said driving shaft for imparting orbital motion to said gimbal ring and container, means for rotating the gimbal ring and container about their axis of support on said carrier, said container having an opening at its upper end concentric with said axis and forming an acute angle with said shaft.

In testimony whereof I have signed this specification in the presence of two subscribing witnesses.

FREDERIC ECAUBERT.

Witnesses:
JOHN LOTKA,
JOHN A. KEHLENBECK.